US011176823B2

United States Patent
Arafa et al.

(10) Patent No.: US 11,176,823 B2
(45) Date of Patent: Nov. 16, 2021

(54) ENHANCED VEHICLE OPERATION

(71) Applicant: Ford Global Technologies, LLC, Dearborn, MI (US)

(72) Inventors: Mayar Arafa, Redwood City, CA (US); Vidya Nariyambut murali, Sunnyvale, CA (US); Xianling Zhang, San Jose, CA (US); Nikita Jaipuria, Union City, CA (US); Rohan Bhasin, Santa Clara, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 16/834,069

(22) Filed: Mar. 30, 2020

(65) Prior Publication Data

US 2021/0304602 A1 Sep. 30, 2021

(51) Int. Cl.
*G08G 1/14* (2006.01)
*G06K 9/62* (2006.01)
*G06N 3/08* (2006.01)
*G06K 9/00* (2006.01)

(52) U.S. Cl.
CPC ......... *G08G 1/141* (2013.01); *G06K 9/00798* (2013.01); *G06K 9/6255* (2013.01); *G06K 9/6267* (2013.01); *G06N 3/08* (2013.01)

(58) Field of Classification Search
None
See application file for complete search history.

(56) References Cited

U.S. PATENT DOCUMENTS

| 8,571,722 | B2 | 10/2013 | Samples et al. |
| 10,078,789 | B2 | 9/2018 | Gupta et al. |
| 10,152,639 | B2 | 12/2018 | Pathangay et al. |
| 10,239,521 | B1 | 3/2019 | Xiao et al. |
| 2017/0053192 | A1 | 2/2017 | Ding et al. |
| 2020/0294310 | A1* | 9/2020 | Lee ........................... G06T 7/13 |

OTHER PUBLICATIONS

Cazamias et al., "Parking Space Classification using Convolutional Neural Networks", Mar. 14, 2016, Stanford University.
Chatterjee, Finding the vacant parking lot, Jun. 4, 2019, https://towardsdatascience.com/parking-occupancy-detection-de25cc0966ef.
Cvijetic, "Searching for a Parking Spot? AI Got It", Sep. 11, 2019, https://blogs.nvidia.com/blog/2019/09/11/drive-labs-ai-parking/.

(Continued)

*Primary Examiner* — Leon Flores
(74) *Attorney, Agent, or Firm* — Frank A. MacKenzie; Bejin Bieneman PLC

(57) ABSTRACT

A computer includes a processor and a memory, the memory storing instructions executable by the processor to input an image to a first layer of a machine learning program, the first layer trained to identify one or more quadrilateral regions in the image, upon identifying the one or more quadrilateral regions, input the collected image to a second layer of a machine learning program, the second layer trained to identify a plurality of sets of vertices, each set of vertices defining a respective polygonal area, identify one of the polygonal areas in which to park a vehicle, and actuate one or more vehicle components to move the vehicle into the identified polygonal area.

20 Claims, 6 Drawing Sheets

(56) References Cited

OTHER PUBLICATIONS

Prakash et al., "Structured Domain Randomization: Bridging the Reality Gap by Context-Aware Synthetic Data", arXiv:1810.10093v1 [cs.CV] Oct. 23, 2018.
Tremblay et al., "Training Deep Networks with Synthetic Data: Bridging the Reality Gap by Domain Randomization", arXiv:1804.06516v3 [cs.CV] Apr. 23, 2018.

* cited by examiner

ENHANCED VEHICLE OPERATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
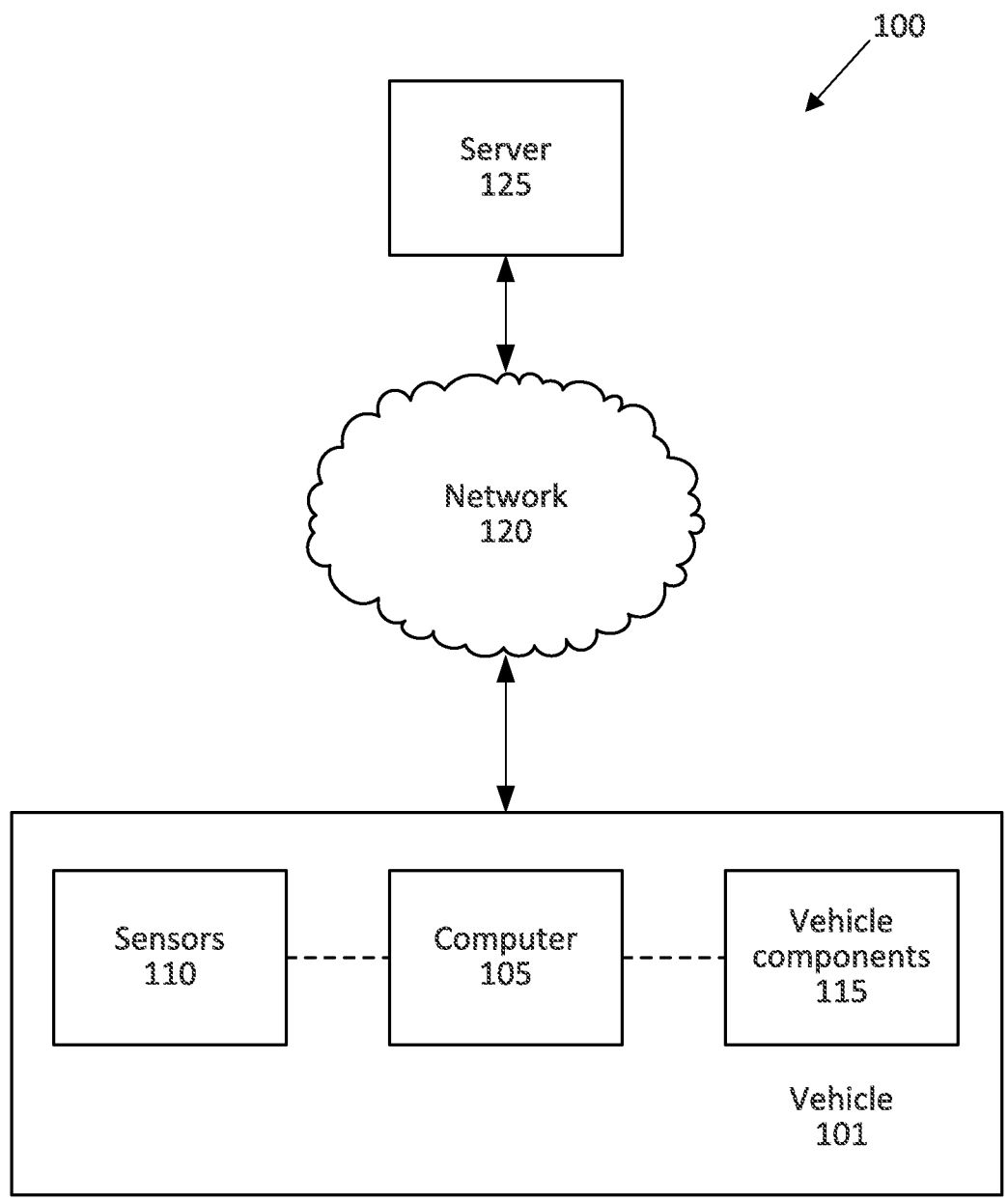
FIG. 1 is a diagram of an example system for parking a vehicle.

A system includes a computer including a processor and a memory, the memory storing instructions executable by the processor to input an image to a first layer of a machine learning program, the first layer trained to identify one or more quadrilateral regions in the image, upon identifying the one or more quadrilateral regions, input the collected image to a second layer of a machine learning program, the second layer trained to identify a plurality of sets of vertices, each set of vertices defining a respective polygonal area, identify one of the polygonal areas in which to park a vehicle, and actuate one or more vehicle components to move the vehicle into the identified polygonal area.

The instructions can further include instructions to input the set of vertices of the identified polygonal area to a path planning algorithm to output a path to move the vehicle into the identified polygonal area.

The instructions can further include instructions to identify a left boundary and a right boundary of the polygonal area and to actuate the one or more vehicle components to move the vehicle between the left boundary and the right boundary.

The instructions can further include instructions to identify the set of vertices of one of the polygonal areas based on a location of a target vehicle identified in the collected image.

The instructions can further include instructions to identify the set of vertices of one of the polygonal areas between the target vehicle and a second target vehicle.

The first layer of the machine learning program can be trained with a plurality of reference images in which boundaries of reference quadrilateral regions are annotated.

The second layer of the machine learning program can be trained with a plurality of reference images in which reference sets of vertices of one or more reference polygonal areas are annotated.

The machine learning program can be trained with a plurality of synthetic images, each synthetic image generated by adding at least one of a lighting feature, a weather feature, a surface texture feature, or a simulated vehicle to a real-world image or a simulated image.

The plurality of synthetic images can include annotations of reference polygonal areas.

At least one synthetic image can include an annotation identifying a polygonal region in which parking is not permitted and the machine learning program can be trained by inputting the at least one synthetic image to identify the polygonal region as a false identification of the polygonal area.

At least one synthetic image can include an annotation identifying boundaries of an area lacking boundary line markings.

The machine learning program can be trained to identify the polygonal area when the collected image lacks one or more boundary line markings.

A method includes inputting a collected image to a first layer of a machine learning program, the first layer trained to identify one or more quadrilateral regions, upon identifying the one or more quadrilateral regions, inputting the collected image to a second layer of a machine learning program, the second layer trained to identify a plurality of sets of vertices, each set of vertices defining a respective polygonal area, identifying one of the polygonal areas in which to park a vehicle, and actuating one or more vehicle components to move the vehicle into the identified polygonal area.

The method can further include inputting the set of vertices of the identified polygonal area to a path planning algorithm to output a path to move the vehicle into the identified polygonal area.

The method can further include identifying a left boundary and a right boundary of the polygonal area and actuating the one or more vehicle components to move the vehicle between the left boundary and the right boundary.

The method can further include identifying the set of vertices of one of the polygonal areas based on a location of a target vehicle identified in the collected image.

The method can further include identifying the set of vertices of one of the polygonal areas between the target vehicle and a second target vehicle.

The method can further include training the first layer of the machine learning program with a plurality of reference images in which boundaries of reference quadrilateral regions are annotated.

The method can further include training the second layer of the machine learning program with a plurality of reference images in which reference sets of vertices of one or more reference polygonal areas are annotated.

The method can further include training the machine learning program with a plurality of synthetic images, each synthetic image generated by adding at least one of a lighting feature, a weather feature, a surface texture feature, or a simulated vehicle to a real-world image or a simulated image.

At least one synthetic image can include an annotation identifying a polygonal region in which parking is not permitted and method can further include training the machine learning program by inputting the at least one synthetic image to identify the polygonal region as a false identification of the polygonal area.

The method can further include training the machine learning program to identify the polygonal area when the collected image lacks one or more boundary line markings.

A system includes a vehicle including a sensor and a plurality of vehicle components, means for collecting an image with the sensor, means for inputting a collected image to a first layer of a machine learning program, the first layer trained to identify one or more quadrilateral regions, means for inputting the collected image to a second layer of a machine learning program, the second layer trained to identify a plurality of sets of vertices, each set of vertices defining a respective polygonal area, upon identifying the one or more quadrilateral regions, means for identifying one of the polygonal areas in which to park the vehicle, and means for actuating one or more of the plurality of vehicle components to move the vehicle into the identified polygonal area.

The system can further include means for inputting the set of vertices of the identified polygonal area to a path planning algorithm to output a path to move the vehicle into the identified polygonal area.

The system can further include means for identifying a left boundary and a right boundary of the polygonal area and actuating the one or more vehicle components to move the vehicle between the left boundary and the right boundary.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Autonomous vehicles can detect open parking spaces in which to park. The spaces can be detected with, e.g., image data from one or more cameras. A computer in a vehicle can identify quadrilateral regions of interest with an object detection model and then fit a polygon with a machine learning program with polygon regression to fit a plurality of vertices to a parking space. Using polygon regression to identify the parking space provides improved efficiency, e.g., speed, of processing of the computer, and facilitates real-time vehicle operation. The machine learning program can use context of an environment around the vehicle to identify the parking spaces when markings on the roadway are occluded or damaged.

The machine learning program can be trained with a plurality of synthetic images. The synthetic images can be generated from real-world images and/or simulated images. A realistic feature program can add features to the real-world images and/or the simulated images to incorporate realistic features. The synthetic images with the realistic features can provide more training data with varied features and scenarios than real-world images and/or simulated images alone, improving training of the machine learning program.

FIG. 1 illustrates an example system 100 for parking a vehicle 101. A computer 105 in the vehicle 101 is programmed to receive collected data from one or more sensors 110. For example, vehicle 101 data may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the vehicle 101, e.g., over a CAN bus, a wireless network, etc. Alternatively or additionally, the memory can be part of the computer 105, e.g., as a memory of the computer 105.

Sensors 110 can include a variety of devices. For example, various controllers in a vehicle 101 may operate as sensors 110 to provide data via the vehicle 101 network or bus, e.g., data relating to vehicle speed, acceleration, position, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers.

Collected data can include a variety of data collected in a vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data.

The vehicle 101 can include a plurality of vehicle components 115. In this context, each vehicle component 115 includes one or more hardware components adapted to perform a mechanical function or operation—such as moving the vehicle 101, slowing or stopping the vehicle 101, steering the vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

In a non-autonomous mode, i.e., a manual mode, the vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a processor and a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
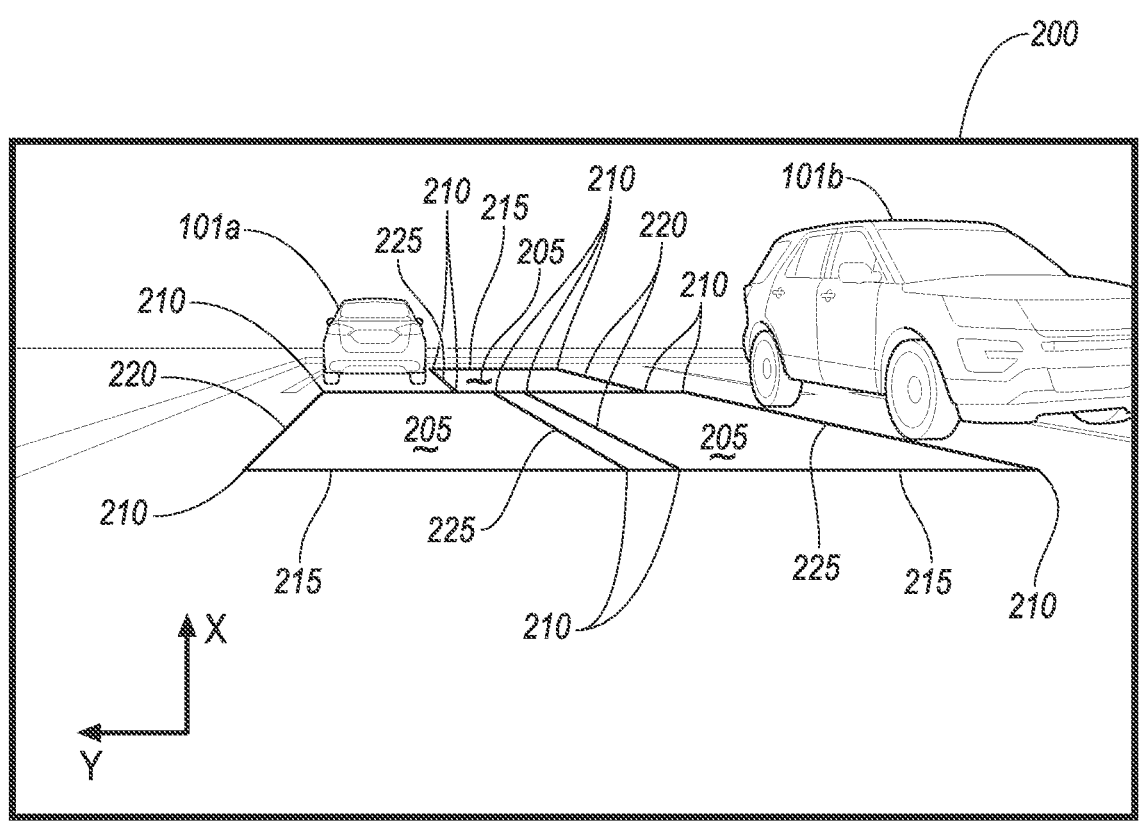
FIG. 2 is a view of an image of an example parking space.

FIG. 2 illustrates an image 200 including at least one parking space. An "image" is a two-dimensional array of values that encode visual data, e.g., a photograph. For example, the image can be a two-dimensional array of values. Each element of the array can be a grayscale value (i.e., a natural number between 0 and 100) of a pixel of a digital photograph. In another example, each element of the array can be a red-blue-green (RGB) value (e.g., a hexadecimal number between 00 and FF for each of red, blue, and green values) of a pixel of a digital photograph. A "parking space" is a geographic area in which parking a vehicle 101 is permitted. The image 200 include a plurality of polygonal areas 205 indicating parking spaces. A "polygonal area" 205 is a set of pixels in the image enclosed an area having a boundary defined by a plurality of vertices 210 connected by line segments. The vertices 210 are respective sets of pixels defining the polygonal area 205.

The computer 105 can identify quadrilateral regions of interest that may include parking spaces. A "region of interest" is a geographic area that can include a parking space. As described below, parking spaces typically have a quadrilateral shape such as a rectangle or a parallelogram. Identifying quadrilateral regions of interest can reduce the possible locations of a parking space in an image 200. That is, because parking spaces typically are quadrilateral, identifying the quadrilateral regions of interest can more quickly identify potential parking spaces.

The polygonal area 205 corresponds to a set of coordinates in a local coordinate system having an origin at the vehicle 101 (e.g., a center point of a rear axle, a center point of a front bumper, etc.). The local coordinate system can be a rectangular coordinate system, i.e., the local coordinate system defines a lateral axis x and a longitudinal axis y, as shown in FIG. 2. The longitudinal axis y extends along a vehicle-forward direction, i.e., the direction in which a propulsion moves the vehicle 101 when a steering is at a neutral position. The lateral axis x extends perpendicular to the longitudinal axis y. Each sensor 110 of the vehicle 101 can collect data in the local coordinate system.

Upon identifying a polygonal area 205, the computer 105 can actuate one or more components 115 to move the vehicle 101 into the geographic area represented by the polygonal area 205. As described above, a polygonal area 205 defines a set of coordinates in the local coordinate system of the vehicle 101. When the computer 105 identifies a plurality of polygonal areas 205, the computer 105 can select one of the polygonal areas 205 in which to park the vehicle 101, as described below. The computer 105 inputs the selected polygonal area 205 into a path planning algorithm to generate a path. The path ends in the location defined by the polygonal area 205.

The path planning algorithm is programming of the computer 105 that generates a path for the vehicle 101 as the vehicle 101 moves from an origin to a destination. The path planning algorithm can be stored in a memory of the computer 105. The path planning algorithm can be, e.g., a navigational algorithm that generates location coordinates for the vehicle 101 over time. As an example, the path planning algorithm can determine the path with a path polynomial. The path polynomial p (s) is a model that predicts the path as a line traced by a polynomial equation. The path polynomial p (s) predicts the path for a predetermined upcoming distance x, by determining a lateral coordinate y, e.g., measured in meters:

$$p(x) = a_0 + a_1 s + a_2 s^2 + a_3 s^3 \tag{1}$$

where $a_0$ an offset, i.e., a lateral distance between the path and a center line of the vehicle 101 at the upcoming distance x, $a_1$ is a heading angle of the path, $a_2$ is the curvature of the path, and $a_3$ is the curvature rate of the path. In the present context, the "upcoming distance" s is a predetermined longitudinal distance in front of the vehicle 101 from a front bumper of the vehicle 101 at which the sensors 110 collect data and the computer 105 predicts the path. The upcoming distance x can be determined based on, e.g., a current speed of the vehicle 101, a predetermined time threshold, determined based on empirical simulation data, a detection range of the sensors 110, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g., limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle along the vehicle path polynomial, where braking torque and powertrain torque are applied as positive and negative longitudinal accelerations and clockwise and counter clockwise steering torque are applied as left and right lateral accelerations. By determining lateral and longitudinal accelerations to achieve predetermined target values within predetermined constraints within predetermined numbers of time periods, the vehicle path polynomial can be constrained to provide a vehicle path polynomial can be operated upon by the computer 105 without exceeding limits on lateral and longitudinal accelerations.

The computer 105 can identify a respective entrance line 215 for each polygonal area 205. An "entrance line" 215 is a line segment connecting two of the vertices 210 that the vehicle 101 passes to enter parking space represented by the polygonal area 205. That is, the path planning algorithm can plan a path that passes the coordinates associated with the entrance line 215 to enter the parking space. By identifying the entrance line 215, the computer 105 can avoid objects near other line segments of the polygonal area 205, e.g., other vehicles 101 in adjacent parking spaces.

The computer 105 can identify a left boundary 220 and a right boundary 225 of the polygonal area 205. A "left" boundary 220 is a line segment connecting two vertices 210 that would be to the left of the vehicle 101 when it crosses the entrance line 215. A "right" boundary 225 is a line segment connecting two vertices 210 that would be to the right of the vehicle 101 when it crosses the entrance line 215. The left and right boundaries 220, 225 specify the left and right extrema of the polygonal area 205. That is, the left boundary 220 is the leftmost portion of the polygonal area 205, and the right boundary 225 is the rightmost portion of the polygonal area 205. When the vehicle 101 is entirely in the polygonal area 205, the vehicle 101 is between the left boundary 220 and the right boundary 225. The computer 105 can actuate the one or more vehicle components 115 to move the vehicle 101 between the left boundary 220 and the right boundary 225.

The computer 105 can identify the vertices 210 of the polygonal area 205 based on a location of a target vehicle 101a identified in the image 200. Parking spaces can be disposed between other vehicles 101, and upon identifying a location of a target vehicle 101a in the local coordinate system, the computer 105 can identify a portion of a parking lot abutting the target vehicle 101a as part of a quadrilateral region of interest. Based on the quadrilateral region of interest, the computer 105 can identify vertices 210 of a polygonal area 205. The computer 105 can identify a location of a second target vehicle 101b. A portion of a parking lot between the first target vehicle 101a and the second target vehicle 101b can be a parking space, and the computer 105 can identify vertices 210 of a polygonal area 205 between the target vehicle 101a and the second target vehicle 101b.

The computer 105 can select one of the polygonal areas 205 in which to park the vehicle 101. A polygonal area can be selected according to a rule specified for parking the vehicle, e.g., the rule specified for an operator of the vehicle 101, a geographic location, and/or other status of the vehicle 101. For example, the computer 105 can identify a polygonal area 205 closest to the vehicle 101 and actuate one or more components 115 to follow a path into the polygonal area 205. In another example, the computer 105 can identify a polygonal area 205 closest to a destination of an operator of the vehicle 101.

Figure 3:
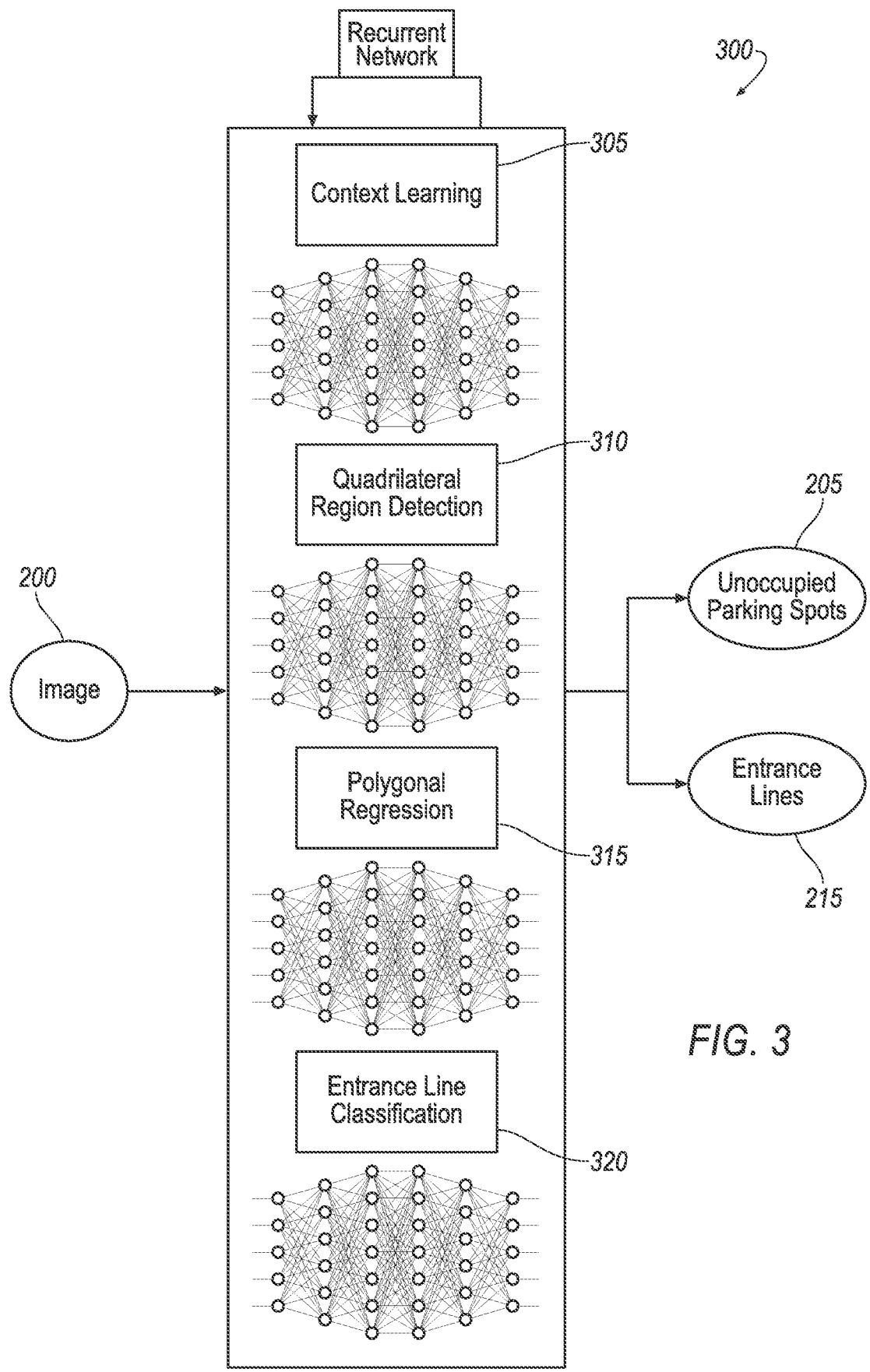
FIG. 3 is a diagram of an example machine learning program.

FIG. 3 is a block diagram of an example machine learning program 300 to detect parking spaces. The computer 105 can input an image 200 into the machine learning program 300 and receive, as output, at least one identified polygonal area 205 representing a parking space and a respective entrance line 215 for the polygonal area 205. As described above, the computer 105 can input the polygonal area 205 and the entrance line 215 to a path planning algorithm to generate a path to move the vehicle 101 into the parking space. The machine learning program 300 is a neural network, e.g., can be a recurrent network that uses sequential computations on inputs to predict an output.

The machine learning program 300 includes a context learning layer 305. The context learning layer 305 identifies one or more realistic features in the input image 200. A "realistic feature" is an object or environmental condition in an image that can occlude or provide information about the parking space. For example, the realistic feature can be a change in lighting, weather such as precipitation, a surface texture of a roadway, another vehicle, a curb, a sidewalk, etc. The context learning layer 305 can be trained by inputting one or more images 200 that have realistic features labeled. Alternatively or additionally, the context learning layer 305 can be trained by inputting one or more synthetic images 200 (i.e., an image 200 into which a feature has been added) that include labels of realistic features, as described below. The server 125 can input the annotated reference images 200 and the synthetic images 200 and can minimize a cost function of the context learning layer 305 with, e.g., gradient descent, a gradient-free genetic algorithm, etc. When the cost function is minimized, the context learning layer 305 can identify one or more realistic features in the input image 200. Based on the context identified in the context learning layer 305, the machine learning program 300 can be trained to identify the polygonal area 205 when the collected image 200 lacks one or more boundary line markings. That is, line markings in a roadway can fade over time, and the context identified in the context learning layer 305 can identify a polygonal area 205 indicating a parking space when the line markings have faded.

The machine learning program 300 includes a quadrilateral region detection layer 310. A "quadrilateral region" is a region that defines a boundary that is a four-sided polygon, i.e., a quadrilateral. The quadrilateral region detection layer 310 identifies one or more quadrilateral regions in the input image 200. Parking spaces are typically quadrilateral in shape, so the quadrilateral region detection layer can identify quadrilateral regions of interest that may be parking spaces. The quadrilateral region detection layer 310 can be trained by inputting one or more reference images 200 with annotations of quadrilateral regions. The server 125 can minimize a cost function of the quadrilateral region detection layer 310 with e.g., gradient descent, a gradient-free genetic algorithm, etc. When the cost function is minimized, the quadrilateral region detection layer 310 can identify one or more quadrilateral regions in the input image 200.

The machine learning program 300 includes a polygon regression layer 315. The polygon regression layer 315 identifies vertices 210 and line segments of polygonal areas 205 in the input image 200. As described above, the polygonal areas 205 are parking spaces in which the vehicle 101 can park. The polygon regression layer 315 can be trained by inputting one or more reference images 200 with annotations of vertices 210 and line segments of polygonal areas 205. The server 125 can minimize a cost function of the polygon regression layer 315 with e.g., gradient descent, a gradient-free genetic algorithm, etc. The cost function can be, e.g., a mean error of a location of vertices 210. Because a quadrilateral has four vertices, the cost function can be:

$$\left( \frac{1}{4} \sum_{i=1}^{4} |v_i^{gt} - v_i^p|^n \right)^{\frac{1}{n}} \qquad (2)$$

where $v_i^{gt}$ is a ground truth vertex 210, i.e., a vertex 210 annotated in a reference image, $v_i^p$ is a prediction of a vertex 210 identified by the polygon regression layer 315, and n is an integer that specifies a statistical error function. The integer n can be 1 or 2, where a value of 1 outputs an absolute mean error and a value of 2 outputs a root-mean-square error. When the cost function is minimized, the polygon regression layer 315 can identify a set of vertices 210 and line segments connecting the vertices 210 of one or more polygonal areas 205 in the input image 200. For a polygon with a different number of vertices 210, e.g., a pentagon with five vertices, a hexagon with six vertices, etc., the respective 4's in Equation 2 can be replaced with the number of vertices 210 of the polygon.

The machine learning program 300 includes an entrance line classification layer 320. The entrance line classification layer 320 identifies an entrance line 215 of the polygonal area 205. As described above, the entrance line 215 is a line segment connecting two of the vertices 210 through which the vehicle 101 moves into the polygonal area 205. The entrance line classification layer 320 can be trained by inputting one or more reference images 200 with annotations of entrance lines 215. The server 125 can minimize a cost function of the entrance line classification layer 320 with, e.g., gradient descent, a gradient-free genetic algorithm, etc. When the cost function is minimized, the entrance line classification layer 320 can identify an entrance line 215 of the polygonal area 205.

Figure 4:
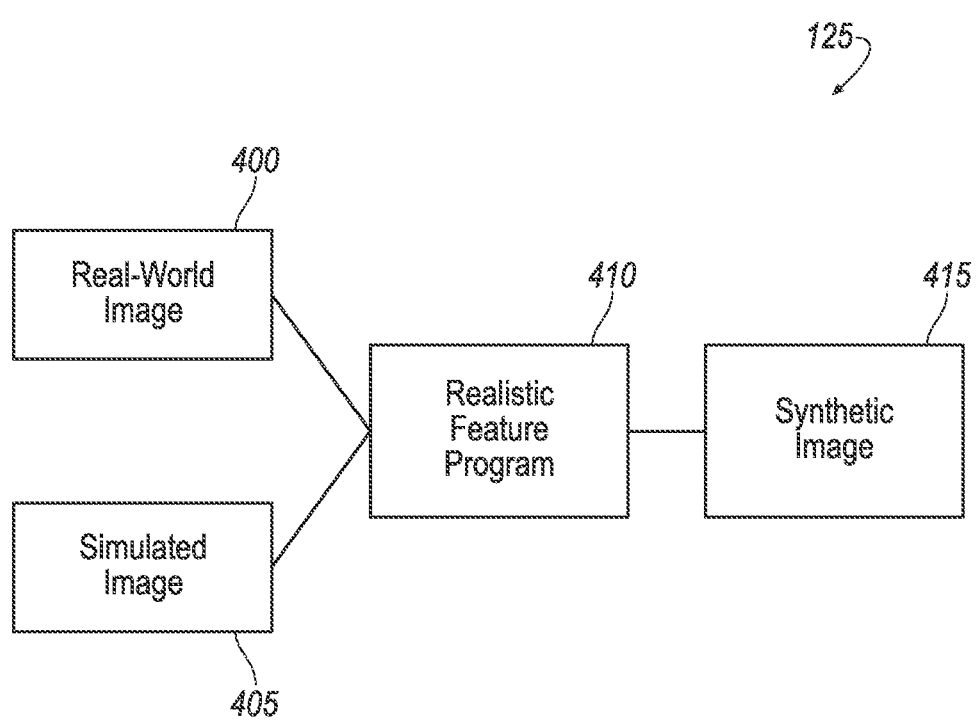
FIG. 4 is a diagram of a server generating a synthetic image.

FIG. 4 is a diagram illustrating the server 125 programmed to input real-world images 400 and/or simulated images 405 to a realistic feature program 410 to generate synthetic images 415. The "synthetic images" 415 are real-world images 400 and/or simulated images 405 with realistic features added. A "realistic feature" is a feature (e.g., an object, an environmental condition, etc.) present in a real-world image that can be added to an image 400, 405 to generate a synthetic image 415. Realistic features can include, e.g., a lighting feature, a weather feature, a surface texture feature, a simulated vehicle 101, etc. To generate the synthetic images 415, the server 125 can input a reference image 400, 405 stored in a memory of the server 125 into a realistic feature program 410 to add one or more realistic features. The "realistic feature program" 415 is one or more algorithms for adding a realistic feature to an input image 400, 405. That is, the realistic feature program 415 is programming executable by a processor of the server 125. The realistic feature program 410 can input a reference realistic feature into the input image 400, 405 to generate the synthetic image 415. The server 125 can store the synthetic image 415 in the memory of the server 125. That is, the realistic feature program 410 can generate a feature vector of the input image 400,405, adjust values of the feature vector according to a feature vector of the reference realistic feature, and then convert the feature vector into the synthetic image 415. The realistic feature program 410 can be, e.g., a generative adversarial network (GAN), a variational auto-encoder (VAE), etc.

The server 125 can generate one or more simulated images 405 with an image-generating engine. The image-generating engine (or image engine) is programming of the server 125 to generate simulated images 405. That is, an "engine" is software programming, and the server 125 executes instructions provided by the image-generating engine to generate simulated images 405 as disclosed herein. The image-generating engine can be, e.g., UNREAL ENGINE®, UNITY®, CRYENGINE®, ID TECH®, etc.

A "simulated" image 405 is an image that is generated by programming of the server 125, e.g., with the image-generating engine, without input from a real-world image 400. That is, the simulated image 405 can be an array of grayscale values representing pixels of an image. The image-generating engine typically can generate a plurality of simulated images 405 faster and with more diverse scenarios than a camera may collect real-world images 400. The simulated images 405 can provide input data for a machine learning program, such as the machine learning program 300. The simulated images 405 can be stored in a memory of the server 125.

The server 125 can use the synthetic images 415 to train the layers 305, 310, 315, 320 of the machine learning program 300. The synthetic images 415 can increase a number of reference images with which to train the machine learning program 300. For example, the synthetic images 415 can include scenarios not present in the real-world images 400 or the simulated images 405, e.g., changes in lighting, changes in cloud opacity, shadow intensity, ground textures, damaged markings, etc. For example, the realistic feature program 410 can incorporate realistic features into the real-world images 400, such as changes to lighting and weather. That is, the real-world images 400 can be collected during daylight and clear weather, at which time collecting the images 400 may be easier than collecting at night or in stormy weather because the daylight illuminates features of a real-world location that may be useful for training the machine learning program 300. That is, in darkness or in stormy weather, unilluminated features and/or features occluded by precipitation may not be captured by cameras that collect the real-world images 400. The realistic feature program 410 can incorporate realistic features such as darkness, rain, and clouds to generate synthetic images 415 that include scenarios at times that collecting the real-world images 400 may be difficult, e.g., during stormy weather, during darkness, etc. The realistic feature program 410 can be trained with reference images from real-world data sets of a reference location at different amounts of ambient light and in different weather conditions.

In another example, the realistic feature program 410 can incorporate realistic features to simulated images 405 to generate synthetic images 415 that more closely resemble real-world images 400 than the simulated images 405 simulated by an image-generating engine described above. That is, the simulated images 405 may lack features present in real-world images 400 and/or may include features not present in real-world images 400. The realistic feature program 410 can include these features from real-world images 400 into the simulated images 405 and/or can remove features not present in the real-world images 400 from the simulated images 405 to generate synthetic images 415 that more closely resemble the real-world images 400 than the simulated images 405. The realistic feature program 410 can be trained with reference real-world images 400 and reference simulated images 405 that simulate the features of the real-world images 400. For example, the realistic feature program 410 can be trained with a reference real-world image 400 of a parking lot during clear daylight and a reference simulated image 405 that simulated the parking lot during the clear daylight.

The reference images can reduce false positive identifications of parking spaces by the machine learning program 300 by increasing a number of images that would result in a true negative output, e.g., images with curbs, sidewalks, cracks, etc. The synthetic images 415 can improve detection of parking spaces in input images that have faded or occluded road markings, such as markings defining a parking space. The synthetic images 415 can generate similar reference images from different real-world datasets. For example, the real-world images 400 can be collected at different locations, and the synthetic images 415 generated from the real-world images 400 can incorporate features into images from one of the locations that are not present in images from the other location. Thus, the synthetic images 415 use features from both locations, increasing the number of features considered by the machine learning program 300 and improving training of the machine learning program 300.

The synthetic images 415 can include annotations provided in the input real-world images 400 and/or the input simulated images 405 indicating references to train the machine learning program 300. That is, the real-world images 400 and/or the simulated images 405 can include annotations indicating reference polygonal areas 205, reference vertices 210, reference entrance lines 215, reference quadrilateral regions of interest, and reference boundaries 220, 225 of a polygonal area 205. The realistic feature program 410 can include the annotations of the images 400, 405 in the output synthetic images 415. To train the machine learning program 300 to identify true negatives, i.e., at least one synthetic image 415 can include an annotation identifying a region in which parking is not permitted. The machine learning program can be trained by inputting the synthetic image 415 to identify the region as a false identification of a polygonal area 205. That is, the machine learning program 300 may identify a region in which parking is not permitted as a region of interest and a polygonal area 205 indicating a parking space 205. The synthetic image 415 can include an annotation indicating that parking is not permitted in the region, and the machine learning program 300 can be trained to identify regions in which parking is not permitted. At least one synthetic image 415 can include an annotation identifying boundaries 225, 230 of a portion of a roadway lacking boundary line markings. That is, line markings in a roadway may fade over time, and the synthetic image 415 can train the machine learning program 300 to identify a polygonal area 205 and corresponding boundaries 225, 230 when the line markings have faded.

Figure 5:
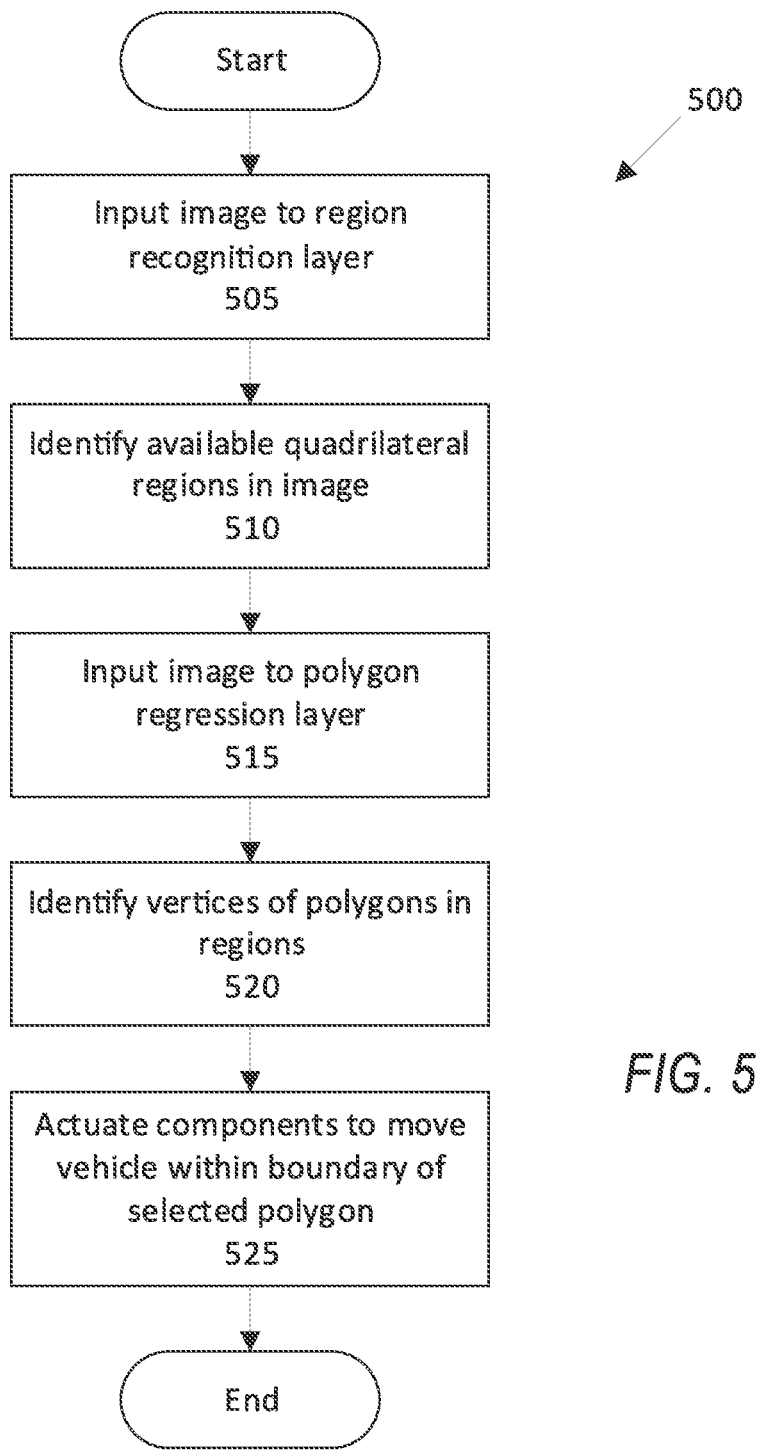
FIG. 5 is a diagram of an example process for parking the vehicle.

FIG. 5 is a diagram of an example process 500 for parking a vehicle 101. The process 500 begins in a block 505, in which a computer 105 of a vehicle 101 inputs an image 200 collected by a sensor 110 into a region recognition layer 310 a machine learning program 300. The region recognition layer 310 is trained to identify regions in the image 200 in which the vehicle 101 can park, e.g., quadrilateral regions have a size at least as large as the vehicle 101.

Next, in a block 510, the region recognition layer 310 identifies one or more available quadrilateral regions in the image 200. As described above, the region recognition layer 310 identifies quadrilateral regions that correspond to a shape of a parking space. The quadrilateral regions in the image 200 are regions that may include a parking space for the vehicle 101. The region recognition layer 310 can use context information determined from, e.g., a context detection layer 305 to identify the quadrilateral regions.

Next, in a block 515, the machine learning program 300 inputs the image 200 with the identified quadrilateral regions to a polygon regression layer 315. The polygon regression layer 315 fits a polygon to the quadrilateral regions identified by the region recognition layer 310, as described above.

Next, in a block 520, the polygon regression layer 315 identifies a set of vertices 210 and line segments connecting the vertices 210 of a polygonal area 205 for each region. As described above, the polygonal area 205 is defined by vertices 210 and the line segments connecting therebetween. The polygon regression layer 315 can use context information determined from, e.g., a context detection layer 305 to identify the vertices 210 and line segments. The polygonal areas 205 are parking spaces in which the computer 105 can park the vehicle 101.

Next, in a block 525, the computer 105 selects one of the polygonal areas 205 and actuates one or more components 115 to move the vehicle 101 into the parking space represented by the polygonal area 205. The computer 105 can select the polygonal area 205 based on, e.g., proximity to the vehicle 101, proximity to a destination, proximity to another vehicle 101, etc. The computer 105 can identify an entrance line 215 output from an entrance line classification layer 320 of the machine learning program 300 and input the polygonal area 205 into a path planning algorithm to generate a path to the parking space. The computer 105 can actuate one or more components 115 to follow the path past the entrance line 215 and into the polygonal area representing the parking space and stop the vehicle 101. Following the block 525, the process 500 ends.

Figure 6:
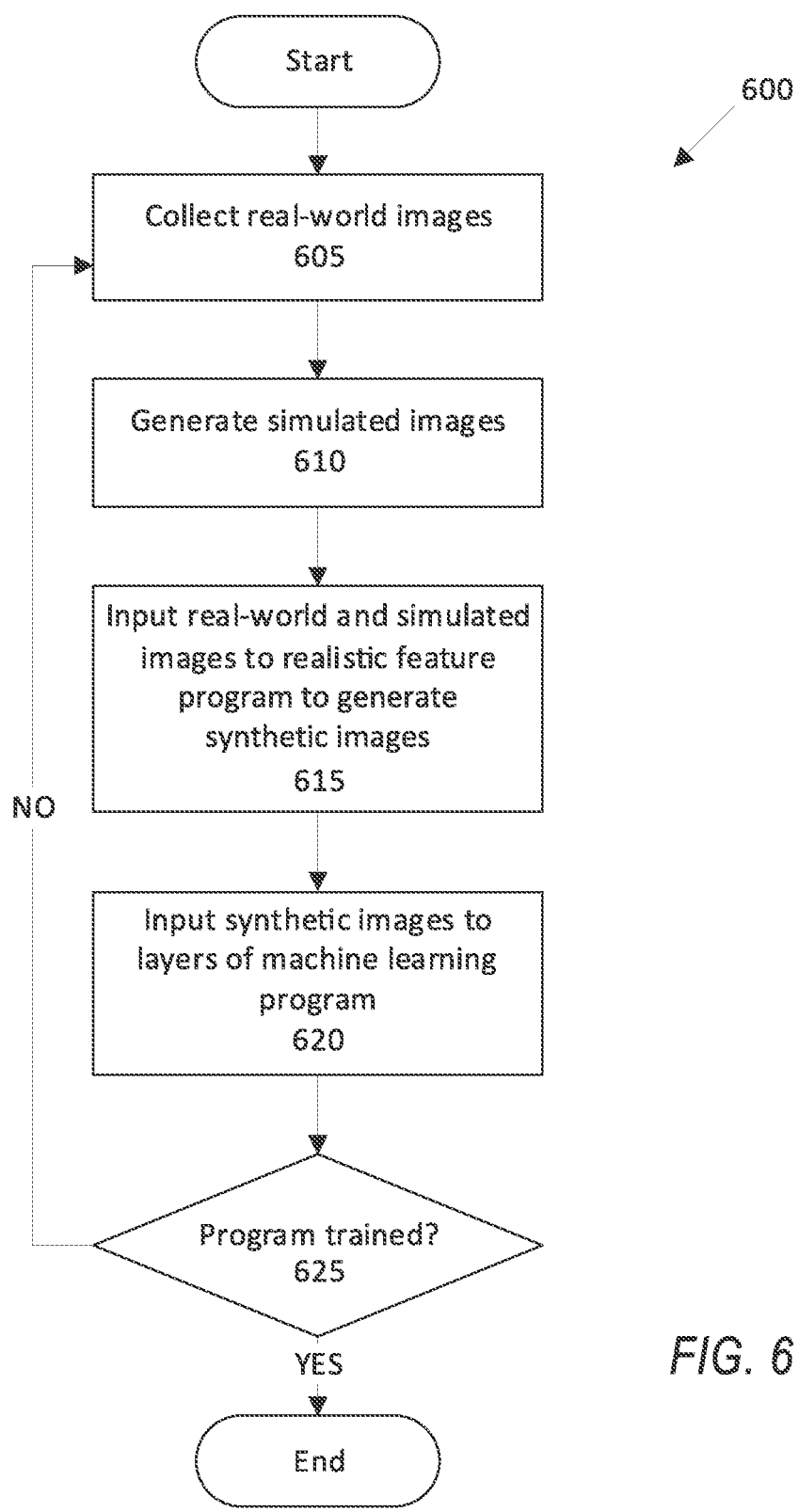
FIG. 6 is a diagram of an example process for generating synthetic images.

FIG. 6 is a diagram of an example process 600 for training a machine learning program 300. The computer 105 can use the machine learning program 300 trained according to the process 600 to identify parking spaces according to the process 500 described above. The process 600 begins in a block 605, in which a server 125 collects one or more real-world images 400. The server 125 can collect the real-world images 400 from one or more cameras of one or more vehicles 101. The real-world images 400 can include images of, e.g., parking lots including empty parking spaces.

Next, in a block 610, the server 125 generates one or more simulated images 405. The simulated images 200, as described above, can be generated with an image-generating engine, e.g., Unreal®. The image-generating engine can generate simulated images 405 of simulated parking lots with simulated parking spaces and simulated vehicles 101. The process 600 may omit one of the blocks 605 or 610, i.e., the process 600 may proceed with only real-world images 400, with only simulated images 405, or both.

Next, in a block 615, the server 125 inputs the real-world images 400 and/or the simulated images 405 into a realistic feature program 410 to generate a plurality of synthetic images 415. As described above, the realistic feature program 410 adds one or more realistic features to the real-world images 400 and/or the simulated images 405 to generate synthetic images 415 that can train the machine learning program 300 with a plurality of features that may not have been captured by the images 400, 405. The realistic features can include, e.g., a lighting feature, a weather feature, a surface texture feature, and/or a simulated vehicle 101.

Next, in a block 620, the server 125 inputs real-world images 400 and/or simulated images 405 and/or synthetic images 415 to layers 305, 310, 315, 320 of a machine learning program 300 to train the machine learning program 300. That is, the server 125 can use, as input data to the machine learning program 300, a set of images that can include real-world images 400 and/or simulated images 405 and/or synthetic images 415. As described above, the images 400, 405, 415 can include realistic features that the layers 305, 310, 315, 320 can identify, and the machine learning program 300 can minimize a respective cost function for each layer 305, 310, 315, 320 based on the input images 400, 405, 415.

Next, in a block 625, the server 125 determines whether the machine learning program 300 has been sufficiently trained. For example, the server 125 can input a test image 200 to the machine learning program 300 and, if the machine learning program 300 correctly identifies a parking space, the server 125 can determine that the machine learning program 300 is trained. If the server 125 determines that the machine learning program 300 is not trained, the process 600 returns to the block 605 to collect more images 200 for training the machine learning program 300. Otherwise, the process 600 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   input an image to a first layer of a machine learning program, the first layer trained to identify one or more quadrilateral regions in the image;
   upon identifying the one or more quadrilateral regions, input the collected image to a second layer of a machine learning program, the second layer trained to identify a plurality of sets of vertices, each set of vertices defining a respective polygonal area;
   identify one of the polygonal areas in which to park a vehicle; and
   actuate one or more vehicle components to move the vehicle into the identified polygonal area;
   wherein the machine learning program is trained with a plurality of synthetic images, at least some of the synthetic images are generated by adding, to a reference image, at least one of a weather feature, a surface texture feature, or a simulated vehicle.

2. The system of claim 1, wherein the instructions further include instructions to input the set of vertices of the identified polygonal area to a path planning algorithm to output a path to move the vehicle into the identified polygonal area.

3. The system of claim 1, wherein the instructions further include instructions to identify a left boundary and a right boundary of the polygonal area and to actuate the one or more vehicle components to move the vehicle between the left boundary and the right boundary.

4. The system of claim 1, wherein the instructions further include instructions to identify the set of vertices of one of the polygonal areas based on a location of a target vehicle identified in the collected image.

5. The system of claim 4, wherein the instructions further include instructions to identify the set of vertices of one of the polygonal areas between the target vehicle and a second target vehicle.

6. The system of claim 1, wherein the first layer of the machine learning program is trained with a plurality of reference images in which boundaries of reference quadrilateral regions are annotated.

7. The system of claim 1, wherein the second layer of the machine learning program is trained with a plurality of reference images in which reference sets of vertices of one or more reference polygonal areas are annotated.

8. The system of claim 1, wherein at least some of the synthetic images are generated by adding, to the reference image.

9. The system of claim 1, wherein the plurality of synthetic images include annotations of reference polygonal areas.

10. The system of claim 1, wherein at least one synthetic image includes an annotation identifying a polygonal region in which parking is not permitted and the machine learning program is trained by inputting the at least one synthetic image to identify the polygonal region as a false identification of the polygonal area.

11. The system of claim 1, wherein at least one synthetic image includes an annotation identifying boundaries of an area lacking boundary line markings.

12. The system of claim 11, wherein the machine learning program is trained to identify the polygonal area when the collected image lacks one or more boundary line markings.

13. The system of claim 1, wherein the reference image is one of a real world image or a simulated image.

14. A method, comprising:
inputting a collected image to a first layer of a machine learning program, the first layer trained to identify one or more quadrilateral regions;
upon identifying the one or more quadrilateral regions, inputting the collected image to a second layer of a machine learning program, the second layer trained to identify a plurality of sets of vertices, each set of vertices defining a respective polygonal area;
identifying one of the polygonal areas in which to park a vehicle; and
actuating one or more vehicle components to move the vehicle into the identified polygonal area;
wherein the machine learning program is trained with a plurality of synthetic images, at least some of the synthetic images are generated by adding, to a reference image, at least one of a weather feature, a surface texture feature, or a simulated vehicle.

15. The method of claim 14, further comprising inputting the set of vertices of the identified polygonal area to a path planning algorithm to output a path to move the vehicle into the identified polygonal area.

16. The method of claim 14, further comprising identifying a left boundary and a right boundary of the polygonal area and actuating the one or more vehicle components to move the vehicle between the left boundary and the right boundary.

17. The method of claim 14, wherein the reference image is one of a real world image or a simulated image.

18. A system, comprising:
a vehicle including a sensor and a plurality of vehicle components;
means for collecting an image with the sensor;
means for inputting a collected image to a first layer of a machine learning program, the first layer trained to identify one or more quadrilateral regions;
means for inputting the collected image to a second layer of a machine learning program, the second layer trained to identify a plurality of sets of vertices, each set of vertices defining a respective polygonal area, upon identifying the one or more quadrilateral regions;
means for identifying one of the polygonal areas in which to park the vehicle; and
means for actuating one or more of the plurality of vehicle components to move the vehicle into the identified polygonal area;
wherein the machine learning program is trained with a plurality of synthetic images, at least some of the synthetic images are generated by adding, to a reference image, at least one of a weather feature, a surface texture feature, or a simulated vehicle.

19. The system of claim 18, further comprising means for inputting the set of vertices of the identified polygonal area to a path planning algorithm to output a path to move the vehicle into the identified polygonal area.

20. The system of claim 18, further comprising means for identifying a left boundary and a right boundary of the polygonal area and actuating the one or more vehicle components to move the vehicle between the left boundary and the right boundary.

* * * * *